(12) United States Patent
King

(10) Patent No.: US 6,583,758 B2
(45) Date of Patent: Jun. 24, 2003

(54) MEMORY REDUCTION METHOD FOR A DSP-BASED GPS PROCESSOR

(75) Inventor: Thomas Michael King, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 152 days.

(21) Appl. No.: 09/791,343

(22) Filed: Feb. 22, 2001

(65) Prior Publication Data

US 2002/0113734 A1 Aug. 22, 2002

(51) Int. Cl.$^7$ ................................................ G01S 5/14
(52) U.S. Cl. ................................................ 342/357.13
(58) Field of Search ........................ 342/357.13, 357.12, 342/385, 386, 357.06; 701/213

(56) References Cited

U.S. PATENT DOCUMENTS

| | | | |
|---|---|---|---|
| 4,998,111 A | 3/1991 | Ma et al. ..................... 342/352 |
| 5,367,306 A | * 11/1994 | Hollon et al. ................ 342/386 |
| 5,402,441 A | * 3/1995 | Washizu et al. ............. 375/208 |
| 5,579,014 A | 11/1996 | Brooksby et al. ...... 342/357.12 |
| 5,663,734 A | 9/1997 | Krasner ................. 342/357.12 |
| 5,781,156 A | 7/1998 | Krasner ................. 342/357.12 |
| 5,841,396 A | 11/1998 | Krasner ..................... 342/357 |
| 5,874,914 A | 2/1999 | Krasner ................. 342/357.12 |
| 6,064,336 A | 5/2000 | Krasner ................. 342/357.05 |
| 6,104,340 A | 8/2000 | Krasner ................... 342/357.1 |
| 6,118,808 A | * 9/2000 | Tiemann et al. ............ 375/210 |

* cited by examiner

Primary Examiner—Gregory C. Issing
(74) Attorney, Agent, or Firm—Shigehaur Furukawa

(57) ABSTRACT

A method and apparatus for determining position in a GPS receiver (FIG. 4) is provided according to the invention. The apparatus includes a first switch (402), the first switch (402) receiving a digital GPS data, a first memory (409), a second memory (410) in parallel with the first memory, with the first memory and the second memory selectable by the first switch (402) for filling with the digital GPS data, and a second switch (416) selectable between the first memory (409) and the second memory (410) in order to extract the digital GPS data therefrom, wherein DSP signal processing (140) extracts digital GPS data from the first memory (409) while the second memory (410) is being filled and extracts digital GPS data from the second memory (410) while the first memory is being filled, and wherein the first memory (409) and the second memory (410) allow the digital GPS data to be processed in real time.

29 Claims, 7 Drawing Sheets

MEMORY REDUCTION METHOD FOR A DSP-BASED GPS PROCESSOR

FIELD OF THE INVENTION

The present invention relates generally to a GPS receiver, and more particularly to a GPS receiver operating in conjunction with a base station.

BACKGROUND OF THE INVENTION

The Global Positioning System (GPS) is a satellite-based system developed by the U.S. Department of Defense to give accurate positional information to a GPS receiver anywhere in the world. A properly equipped GPS receiver may therefore be used in any setting in which a positional fix is desired, and typically yields positional coordinates in three dimensions. The GPS system is enabled by a satellite orbital constellation made up of 24 or more satellites orbiting the earth in 12-hour orbits. The satellites are arranged in six orbital planes, each containing four satellites. The orbital planes are spaced sixty degrees apart, and are inclined approximately fifty-five degrees from the equatorial plane. This constellation ensures that from four to twelve satellites will be visible at any time at any point on earth.

A GPS receiver is capable of determining a positional fix in three dimensions. This may be achieved if signals are being received from four or more GPS satellites. The received satellite signals each contain an identifier unique to that particular satellite. These identifier codes are commonly called Gold codes and allow a GPS receiver to discriminate between signals from different satellites. Also contained within the signals are satellite ephemeris data containing information such as an orbital configuration and a satellite time (all GPS satellite signals contain a common, synchronized time). This time signal allows a GPS receiver to detect a time of receipt and therefore measure a transit time of the signal. In turn, the transit time enables a GPS receiver to determine a distance (termed a pseudorange) to the satellite. The pseudorange D to a single satellite is shown in FIG. 1. The pseudorange does not give a simple distance to a particular spot. The pseudorange from a particular satellite to the GPS receiver may describe a circle on the Earth (if the satellite is directly overhead), or, as is more likely, may describe an arc such as a parabola upon the curved surface of the earth.

FIG. 2 shows three GPS satellites A, B, and C. Each satellite gives a pseudorange curve, with the three intersecting at one point. These three (or more) curves may be solved to find a positional fix of the intersecting point (i.e., a positional fix of the GPS receiver). Three such GPS pseudoranges allow a location on the Earth's surface to be determined, while four yield a three dimensional determination.

Another important satellite characteristic is a Doppler signature. Electromagnetic waves appear to be increased or decreased in frequency when the wave source is moving relative to a receiver. This is termed the Doppler effect. The Doppler effect is observed by GPS receivers, and is the most pronounced when a GPS satellite is at a low angle above the horizon. A GPS satellite directly overhead is nearly motionless (i.e., zero Doppler) with respect to an observer (satellite A in FIG. 2), while a satellite B low on the horizon, traveling at the same velocity as satellite A, will be moving faster with respect to the observer. Each visible satellite therefore may be moving at a different speed relative to a point on the ground, and as a result may have a unique Doppler signature. Therefore, a Doppler signature of satellite C will be much larger than one for satellite B. These Doppler signatures can be used to compute user velocity vector.

The GPS satellites transmit data to be used by GPS receivers, including identification data, satellite position data (ephemeris data), and satellite clock correction data. The GPS signal includes a carrier signal that is bi-phase modulated with a 1023 bit long Gold spreading code at a 1.023 MHz chip rate (0.001 second repeat interval). It is also modulated by data bits at a 50 bits per second (BPS) rate (transmitted at a rate of twenty milliseconds per data bit). The 50 BPS data includes information for determining a GPS-based time (i.e., a clock time of the GPS satellite) and information for determining geographical location.

Detailed information on the data contained within the GPS signal is available in Interface Control Document ICD-GPS-200, revised in 1991, published by Rockwell International Corporation and incorporated herein by reference.

A prior art GPS receiver 100 is shown in FIG. 3 and is described in U.S. Pat. No. 5,663,734 to Krasner. The prior art GPS receiver 100 includes an antenna 102, a down converter 105, a reference oscillator 107, a clock generator 112, an analog-to-digital converter (A/D) 114, a dynamic random access (DRAM) memory 118, a memory sequencer 122, a mixer 127, a numerically controlled oscillator (NCO) 133, a dual port stack RAM 136, a digital signal processor (DSP) 140, and a local DSP results RAM 144.

The prior art GPS receiver 100 receives a GPS signal at the antenna 102 and down-converts it into an intermediate frequency signal (IF signal). The IF signal is fed to the A/D 114, where it is converted into a digital GPS signal. The resulting digital GPS signal is then stored continuously into the DRAM 118. The DRAM 118 of the prior art is very large, typically involving about 16 Mbits (16 million bits) of memory. Such a large memory size is typically needed to capture about 1 second of GPS data. Once an entire 1 second sample is stored in the DRAM 118, it is typically read out and processed by a programmable signal processor for the purpose of extracting the signal pseudoranges and Doppler shift characteristics for all visible GPS satellite signals stored in the DRAM 118.

The 1 second digital GPS data segment is post-processed, in a sequential fashion. The prior art scheme does not process the incoming signal in real time. One reason for this is that by storing a large sample of GPS data (i.e., 1 second), the DSP 140 does not need a throughput capable of keeping up with the incoming data. The prior art GPS receiver 100 typically operates by collecting a 1-second sample and then taking about 3 to 10 seconds to process the sample. During the processing time, the incoming GPS signal is simply not stored or used. The result is certain coarseness to the GPS positional fix. The positional fix may have a time lag and may not accommodate frequent positional changes, which is especially important in mobile applications. These drawbacks may be acute in applications where the positional fixes are used to gather data, such as in geographical survey or agricultural sampling applications.

Another drawback of the prior art is that the large size of the DRAM 118 incurs unneeded cost in a GPS receiver or a device incorporating a GPS receiver. Such a device might be, for example, a cellular phone or a pager.

In the prior art processing arrangement, in order to process data from 4 to 8 GPS satellites (generally 4 to 8 GPS satellites are visible at any time at any point on the Earth), a prior art GPS receiver operating in a sequential fashion would need to have a processor throughput on the order of about 500 MIPs (Millions of Instructions Per Second). This is, of course, a very high throughput requirement, and such a processor, if available, would be expensive and would generate a lot of heat.

There remains a need in the art, therefore, for a GPS receiver having a reduced memory requirement that can process incoming GPS data in real time.

DETAILED DESCRIPTION OF THE PREFERRED EMBODIMENTS

Figure 1:
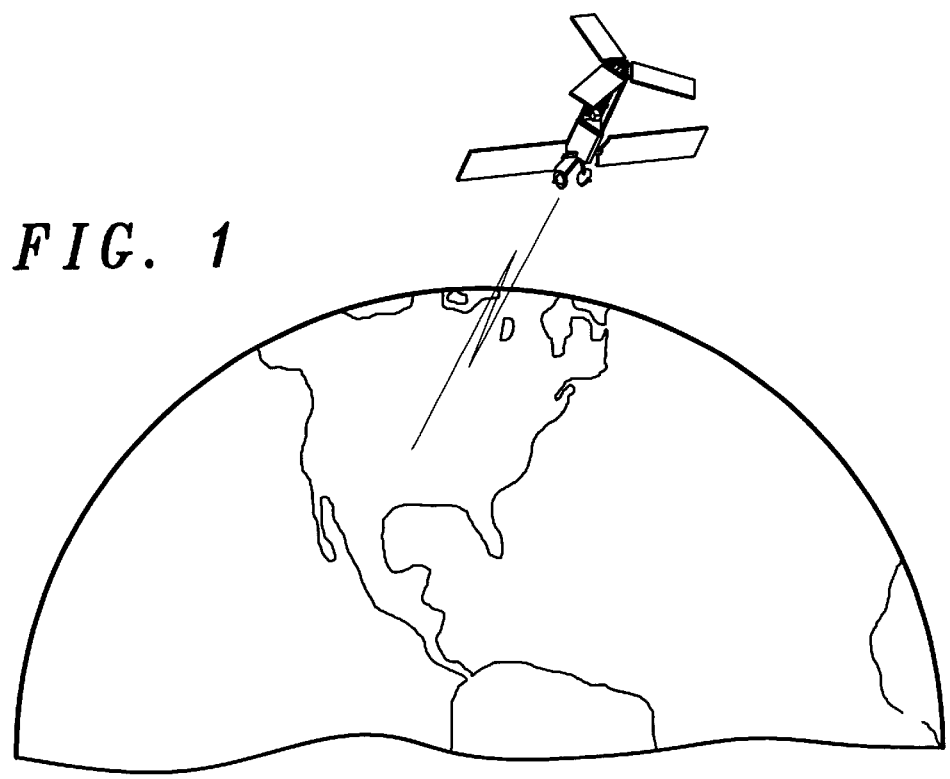
FIG. 1 shows a pseudorange D from a GPS satellite to a GPS receiver.
Figure 2:
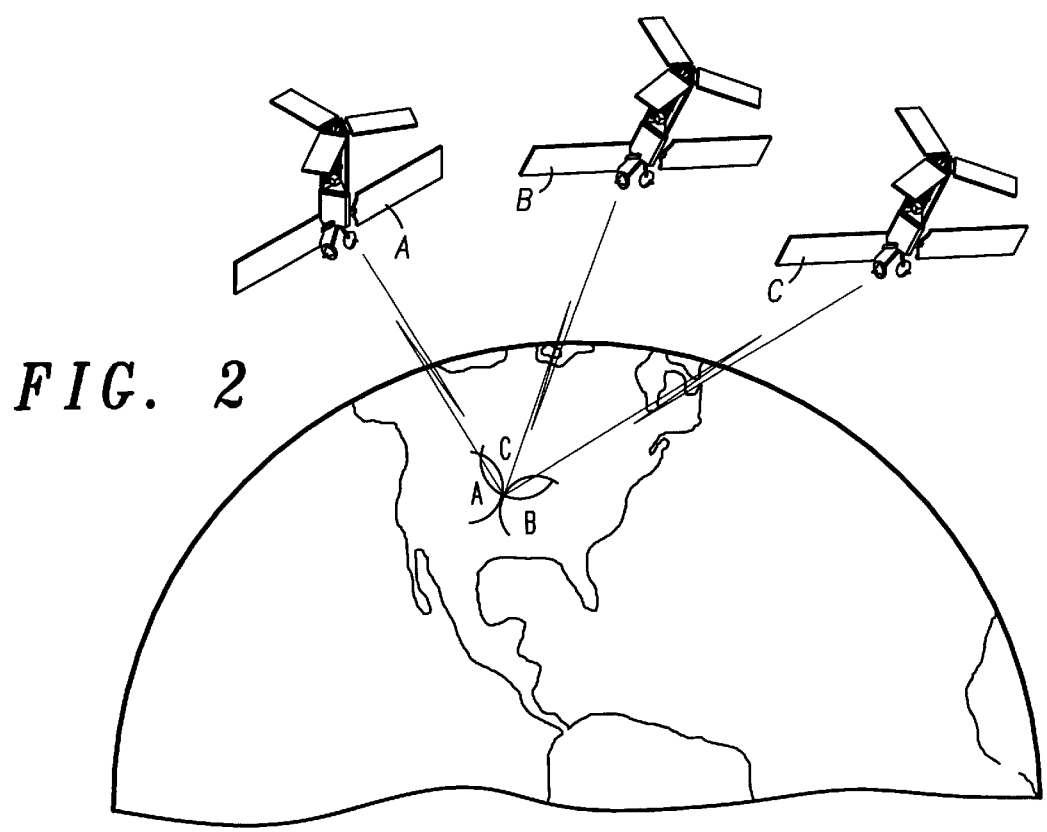
FIG. 2 shows three GPS satellites A, B, and C and three pseudorange curves, with the three pseudorange curves intersecting at one point on the surface of the Earth.
Figure 3:
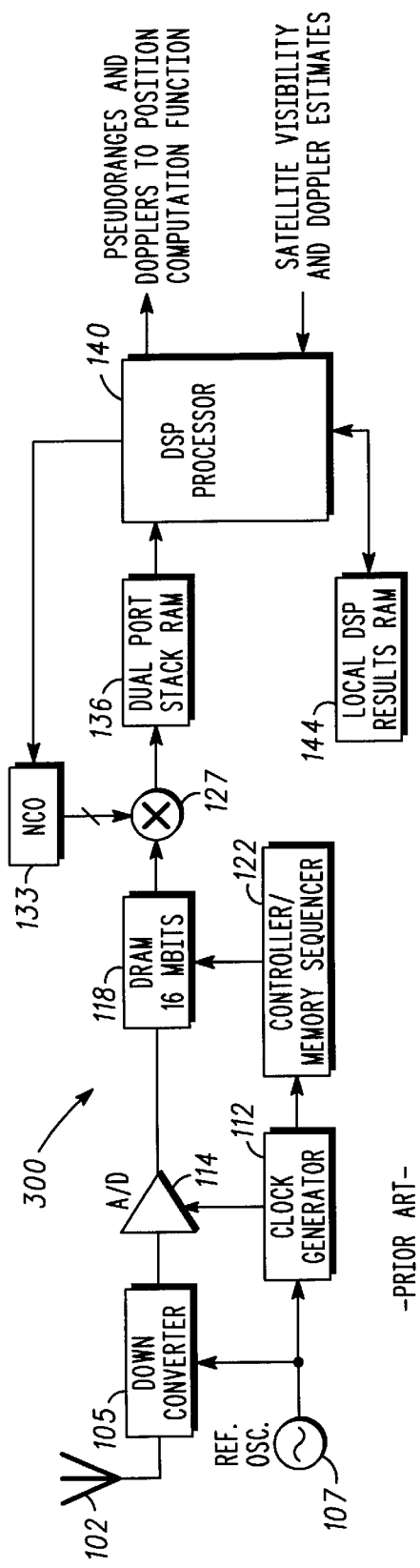
FIG. 3 shows a prior art GPS receiver.

A GPS receiver data storage apparatus is provided according to a first aspect of the invention. The apparatus comprises a first switch, the first switch receiving a digital GPS data, a first memory, a second memory in parallel with the first memory, with the first memory and the second memory being selectable by the first switch for filling with the digital GPS data, and a second switch selectable between the first memory and the second memory for extracting the digital GPS data therefrom, wherein GPS signal processing extracts digital GPS data from the first memory while the second memory is being filled and extracts digital GPS data from the second memory while the first memory is being filled.

A GPS receiver apparatus is provided according to a second aspect of the invention. The apparatus comprises a first switch, the first switch receiving a digital GPS data, a first memory, a second memory in parallel with the first memory, with the first memory and the second memory being selectable by the first switch for filling with the digital GPS data, a second switch selectable between the first memory and the second memory for extracting the digital GPS data therefrom, a mixer connected to the second switch and further connected to a numerically controlled oscillator with the numerically controlled oscillator being provided with predetermined Doppler characteristics, the mixer being capable of removing a Doppler characteristic from the digital GPS data, a stack RAM connected to the mixer, the stack RAM being capable of accumulating a predetermined time interval of the digital GPS data from the mixer, and a digital signal processor connected to the stack RAM, the digital signal processor capable of receiving the digital GPS data and generating pseudoranges and Doppler characteristics for each visible GPS satellite, wherein GPS signal processing extracts digital GPS data from the first memory while the second memory is being filled and extracts digital GPS data from the second memory while the first memory is being filled, and wherein the first memory and the second memory allow the digital GPS data to be processed in real time.

A GPS receiver apparatus is provided according to a third aspect of the invention. The apparatus comprises a first switch, the first switch receiving a digital GPS data, a first memory, a second memory in parallel with the first memory, with the first memory and the second memory being selectable by the first switch for filling with the digital GPS data, a second switch selectable between the first memory and the second memory for extracting the digital GPS data therefrom, a mixer connected to the second switch and further connected to a numerically controlled oscillator with the numerically controlled oscillator being provided with predetermined Doppler characteristics, the mixer therefore being capable of removing a Doppler characteristic from the digital GPS data, a stack RAM connected to the mixer, the stack RAM being capable of accumulating a predetermined time interval of the digital GPS data from the mixer, and a plurality of parallel correlators connected to the stack RAM, the plurality of parallel correlators also receiving a plurality of predetermined Gold codes from a base station, with each Gold code of the plurality of predetermined Gold codes being unique and corresponding to a visible GPS satellite, and with each correlator of the plurality of parallel correlators being capable of correlating a unique Gold code against the digital GPS data, and a plurality of parallel non-coherent integrators connected to the plurality of parallel correlators and capable of integrating each correlation output to provide a plurality of pseudorange and Doppler characteristic outputs, wherein GPS signal processing extracts digital GPS data from the first memory while the second memory is being filled and extracts digital GPS data from the second memory while the first memory is being filled, and wherein the first memory and the second memory allow the digital GPS data to be processed in real time, and wherein the plurality of parallel correlators and the plurality of parallel non-coherent integrators parallel process digital GPS data for each visible GPS satellite.

A method of storing and processing a digital GPS signal in a GPS receiver having a reduced amount of memory is provided according to a fourth aspect of the invention. The method comprises the steps of storing the digital GPS signal in a first memory during a first predetermined time period, and extracting a first stored digital GPS data segment from a second memory simultaneous with the storing of the digital GPS signal in the first memory, wherein during subsequent predetermined time periods the storing step alternates between the first memory and the second memory while the extracting step alternates between the second memory and the first memory.

A method of storing and processing a digital GPS signal in a GPS receiver having a reduced amount of memory is provided according to a fifth aspect of the invention. The method comprises the steps of storing the digital GPS signal in a first memory during a first predetermined time period, extracting a first stored digital GPS data segment from a second memory simultaneous with the storing of the digital GPS signal in the first memory, generating a predetermined Doppler signature for a subject visible satellite, mixing the predetermined Doppler signature with the first stored digital GPS data segment to remove a Doppler characteristic from the first stored digital GPS data segment, correlating a Gold code of the subject visible satellite to the first stored digital GPS data segment, producing a correlation output, and integrating the correlation output to produce a pseudorange output and a Doppler output, wherein the generating step through the mixing step are repeated for each visible satellite, and wherein during subsequent predetermined time periods the storing step alternates between the first memory and the second memory while the extracting step alternates between the second memory and the first memory.

A method of minimizing a GPS satellite search time in a GPS receiver having a plurality of correlation and integration satellite processing branches is provided according to a sixth aspect of the invention. The method comprises the steps of computing initial conditions that estimate a position of the GPS receiver and that estimate a GPS receiver clock accuracy, computing an initial range estimate, and computing an optimum satellite search order, with the optimum satellite search order computed so as to minimize a search space and minimize a search time needed to find visible OPS satellites.

Figure 4:
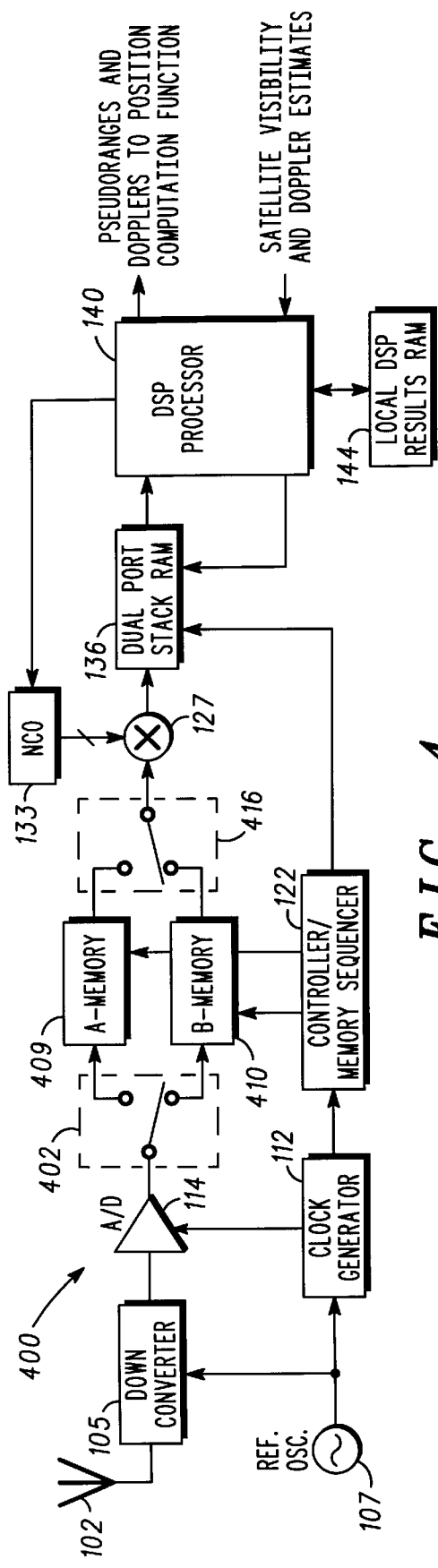
FIG. 4 shows a first embodiment of the GPS receiver of the present invention.

The above and other features and advantages of the present invention will be further understood from the following description of the preferred embodiments thereof, taken in conjunction with the accompanying drawings. FIG. 4 shows a first embodiment 400 of the GPS receiver of the present invention. The GPS receiver 400 may be incorporated into a cellular phone or pager, and to operate must function as part of a network where certain data is provided by a base station, such as data on visible GPS satellites, including a pseudo random noise PRN) number or Gold code that uniquely identifies each GPS satellite. The base station may also provide data such as a calibrated local time, Doppler characteristics for all visible satellites, and other satellite ephemeris data useful for identifying visible GPS satellites, the characteristics of such GPS signals such as Doppler signature, code phase delay signature, and providing a GPS position fix. This data may be received from the base station by way of, for example, a radio transmission. Alternatively, this data can be computed in the receiver by use of approximate time, almanac, ephemeris and approximate position information. Any or all of the data can be communicated to the receiver or used internally.

The GPS receiver 400 replaces the very large DRAM 118 of the prior art with a first switch 402, a first memory 409 (A-RAM), a second memory 410 (B-RAM), and a second switch 416. The first switch 402 and the second switch 416 operate in opposition to fill the memories and to simultaneously extract data, as will be discussed below.

The memories 409 and 410 are preferably dynamic RAM (DRAM) as used in the prior art for reasons of memory efficiency. However, the memories 409 and 410 could alternately be memory types such as static RAM (SRAM), optical memory, linear shift registers, etc.

The first memory 409 and the second memory 410 are preferably the same size, but both must be at least of a minimum size to handle the incoming data. The memories 409 and 410 are preferably selected to store about 2 to about 20 milliseconds of continuous GPS data. The algorithm used to determine memory size will be discussed below in conjunction with FIG. 9 and is a function of DSP processor MIPs available and memory cost.

Figure 5:
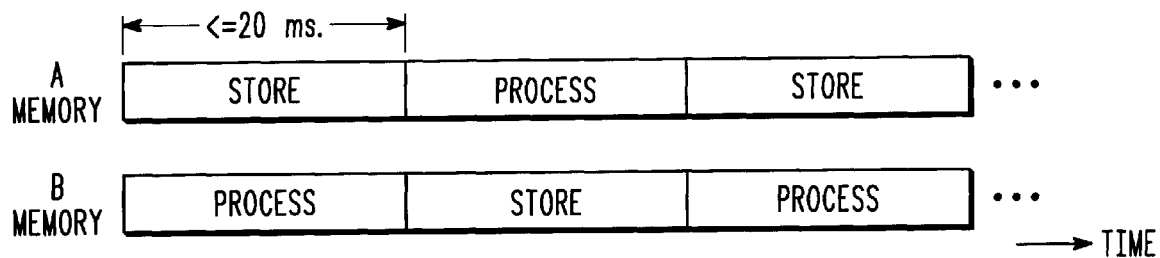
FIG. 5 shows the alternating storing and extracting of data in the memories.

FIG. 5 shows the alternating storing and extracting of data in the memories 409 and 410. While the incoming digital GPS signal data is being stored in the first memory 409 (the A-RAM), a stored digital GPS signal data segment in the second memory 410 (the B-RAM) is simultaneously being extracted and processed. This is done for a predetermined time period, with the predetermined time period in a preferred embodiment being about 20 milliseconds. At the end of the predetermined time period, the process switches and the incoming digital GPS signal data is stored into the second memory 410 while simultaneously the digital GPS data segment in the first memory 409 is being extracted and processed. It should be understood that other time periods might be used, based on the size of the memories 409 and 410.

Figure 6:
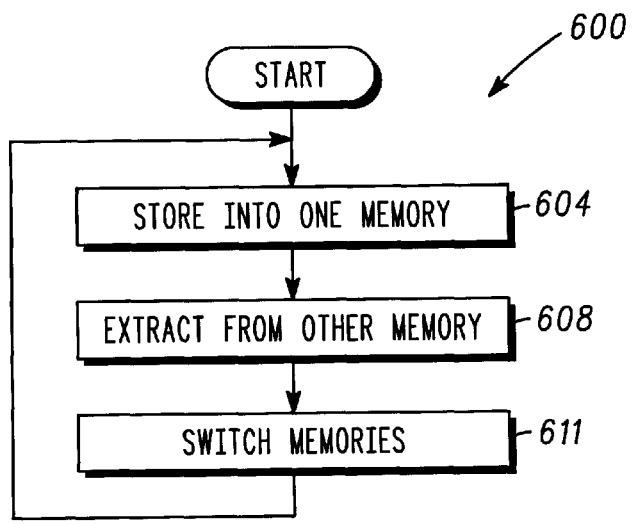
FIG. 6 shows a flow chart of a first embodiment of the method of the present invention.

FIG. 6 shows a flow chart 600 of a first embodiment of the method of the present invention. In step 604, the incoming digital GPS data signal is stored in a memory. The memory may be either the first memory 409 or the second memory 410.

In step 608, a previously stored digital GPS data segment is extracted from the other memory, i.e., the memory not used by step 604 above. Therefore, if step 604 is storing data in the first memory 409, then a data segment is being extracted in step 608 from the second memory 410. Conversely, if step 604 is storing data in the second memory 410, then step 608 is extracting a data segment from the first memory 409 (see FIG. 5).

In step 611, the predetermined time period has expired, and the storing and extracting steps switch memory devices. In this fashion, the GPS receiver 400 can store an incoming GPS signal while simultaneously processing a received signal, and with a much smaller memory requirement.

Figure 7:
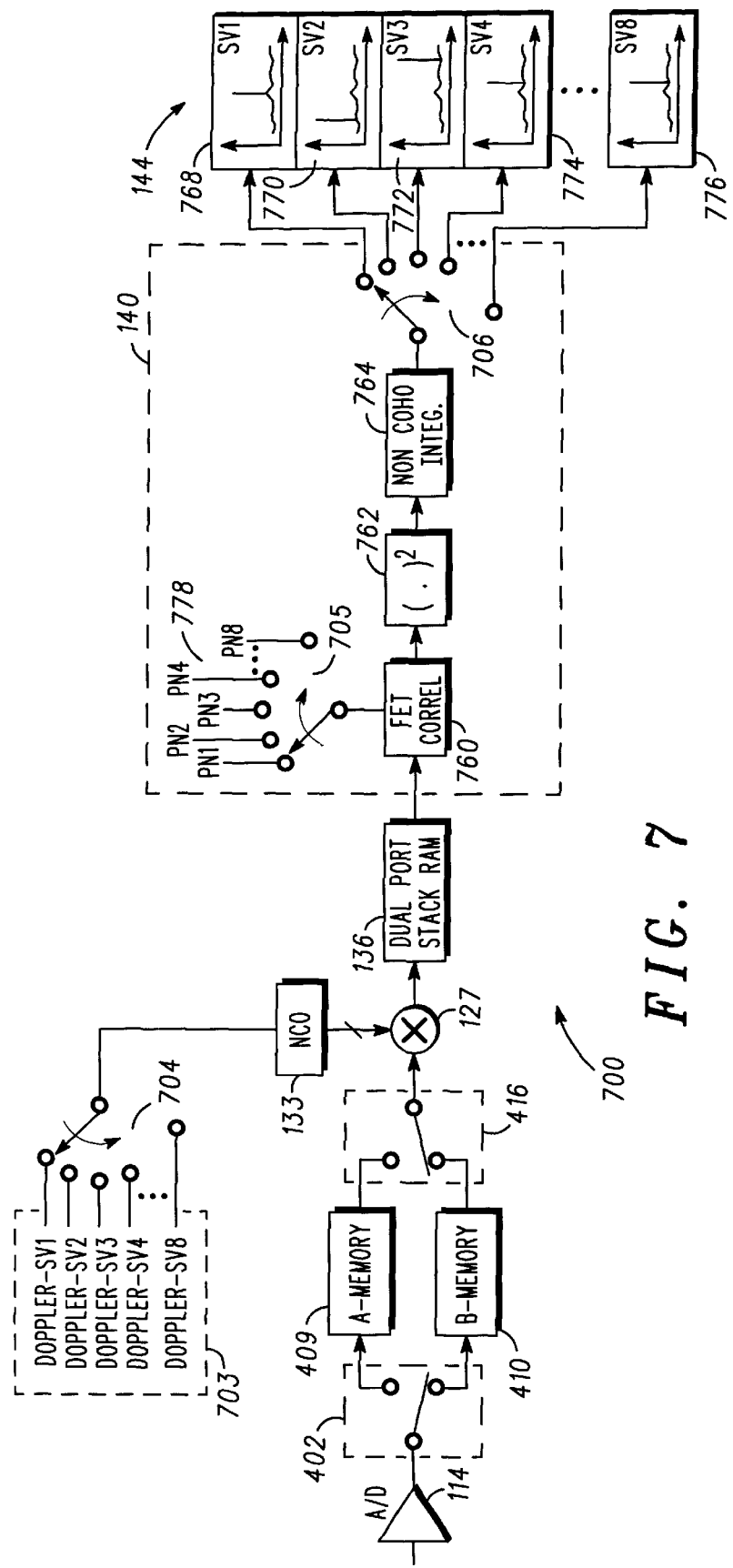
FIG. 7 shows a second embodiment of the GPS receiver of the present invention.

FIG. 7 shows a second embodiment 700 of the GPS receiver of the present invention. In the second embodiment 700, the signal processing steps can be achieved by a single programmable digital signal processor 140 that processes each satellite sequentially, producing multiple outputs stored in the local DSP results RAM 144.

FIG. 7 shows the switch 402 configured to fill the A-RAM 409 and the switch 416 configured to process the contents of the B-RAM 410. The DSP processor 140 can be configured to serially process all visible satellites in one RAM while the other RAM is being filled (as long as the DSP processor 140 has sufficient processing speed to accomplish the task within the time it takes to fill the RAM with new data). FIG. 7 shows switch 704, 705, and 706 configured to serially process visible GPS satellites SV1 through SV8 during the period of time (typically, 2 to 20 milliseconds) in which the B-RAM 410 is being processed.

When switch 416 is first configured to read the output of B-RAM 410, switches 704, 705, and 706 are configured to receive SV1 data. As for switch 704, it is configured to cause the numerically controlled oscillator (NCO) 133 to produce a Doppler replica for SV1. The contents of the B-RAM 410 are sequentially read out of the B-RAM memory 410 and through the switch 416 into the mixer 127, where the Doppler estimate for SV1 is removed from the GPS data signal as the data is stacked into the stack RAM 136. Recall that the stack RAM compresses the 2 to 20 milliseconds of data stored in the B-RAM to a one millisecond equivalent. After the stacking operation is complete, switch 705 is configured so that the FFT correlator 760 correlates the contents of the stack RAM 136 with the PN code representing satellite SV1. The output of the FFT correlator 760 is a series of data points that correspond to the signal magnitude at every possible code phase delay of the PN code. The resulting "spectrum" output from the FFT correlator 760 is magnitude-squared (element by element) in the magnitude squaring block 762, and then non-coherently integrated in a local DSP results RAM 144. The integration result is stored in a SV1 memory sector 768.

Non-coherent integration occurs by adding the memory element corresponding with code phase delay zero (stored in memory 768) with the most recent squared magnitude code phase delay zero element from the FFT correlator 760. Likewise, the code phase delay one memory location in 768 is added to the most recent squared magnitude code phase delay one element from the FFT correlator 760. The non-coherent integration process continues until the last code phase delay memory location in SV1 memory sector 768 is added to the most recent squared magnitude last code phase delay element from the FFT correlator 760. In a preferred embodiment, up to eight or more satellites are tested within the time dedicated to store new information into the A-RAM 409, which is typically an integer two to twenty milliseconds in duration.

One can consider the 8 serial processes (SV1 through SV8) as eight opportunities to find GPS signals. One can assign each search time slot to search for one individual satellite, or one could assign each search time slot to a same satellite signal but at different Doppler rates. In this manner, it is possible to tailor the search process in the direction of where it can do the most good, such as rapidly reducing the Doppler range uncertainty first by looking for the same satellite at many different Doppler frequencies.

Once the entire process for satellite SV1 is completed, the switches 704, 705, and 706 are moved to process data for satellite SV2. The process repeats as described above, then switches 704, 705, and 706 are configured to process all remaining satellites SV3 through SV8, all within the time it takes to store the next N-millisecond sample in the A-RAM 409.

Note that the FFT correlator 760 can be a frequency domain correlator such as a software-based FFT correlator as taught by Ma and Durboraw in U.S. Pat. No. 4,998,111; a hardware based flash parallel 2048 point complex tit correlator such as described in the Motorola MC92307 data sheet; or it can be a time-domain hardware-based correlator such as described by King in U.S. Pat. No. 5,148,452.

What is clear in a serial process as described in FIG. 7 is that the processing capability must keep up with the data collection. This may put a constraint on the processing power of such a high-speed digital signal processor. It is also clear that the processing time is only a function of the clock rate of the clocking signal controlling the digital processing, and is not a function of the input data rate. As such, it is believed that this architecture can remain the same over time, and as digital integrated circuit technology clock rates continue to climb, that many more opportunities to search can be added (well above the 8 satellite search capability discussed here). Ultimately, all of the satellites in the GPS constellation and all of the Doppler bins may be searched simultaneously, using one high-speed function that accomplishes the operations of the Doppler wipe-off (133, 127), the stacking memory 136, the correlator 760, the magnitude squaring block 762, the non-coherent integration function 764, and the local results RAM 768. Building such a receiver that can accomplish searching for all possible satellites at all possible Dopplers and code phase delays will eliminate the need for transmitting or computing locally the Doppler, code phase, or SVID assist information for the receiver.

Figure 8:
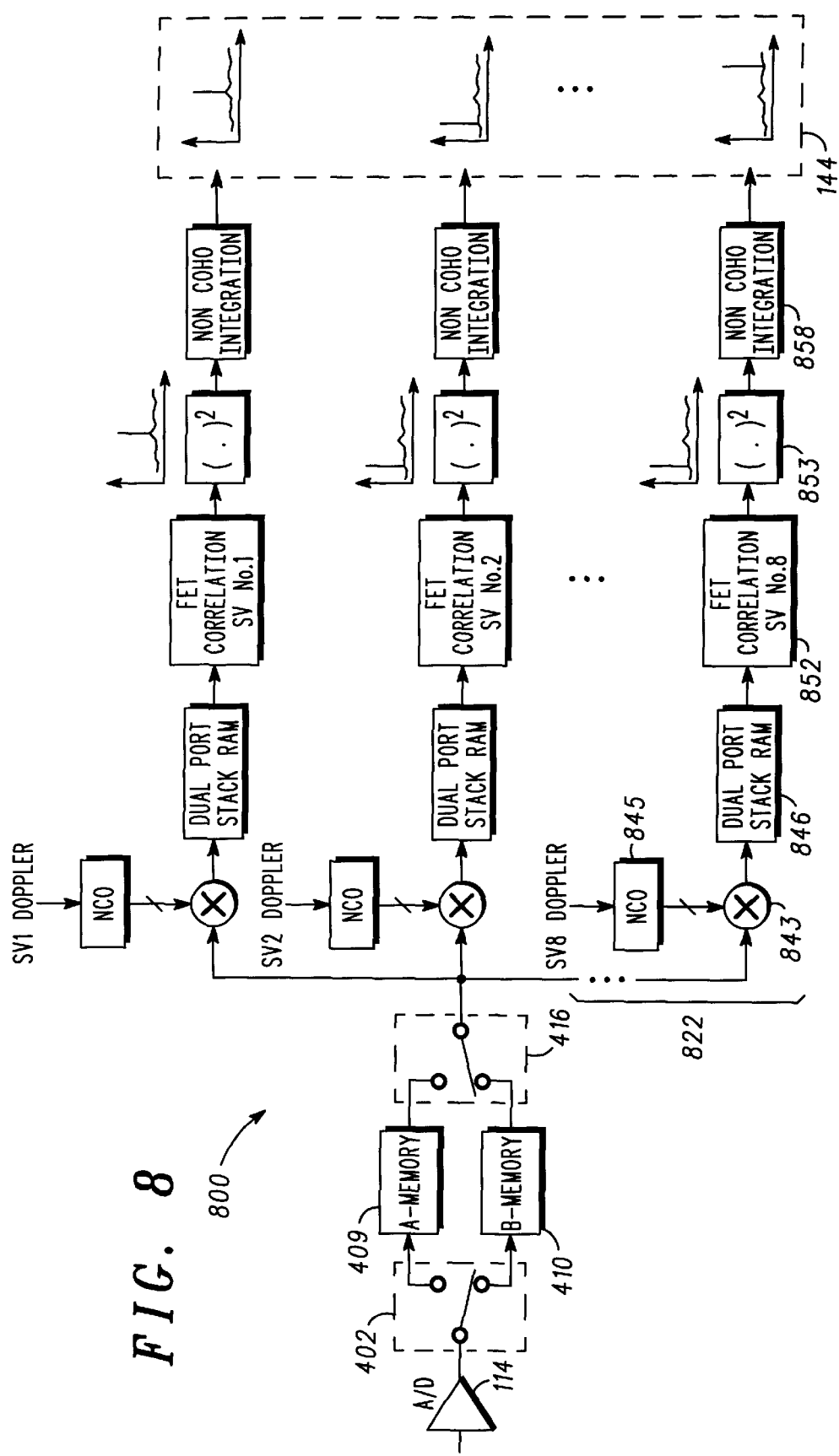
FIG. 8 shows a third embodiment of the GPS receiver of the present invention.

One way to combat the processing load (until time that one high-speed serial processor can do it) is to add a plurality of N parallel processing branches (N typically being 8 or more). FIG. 8 shows a third embodiment 800 having a plurality of processing branches 822, with a processing branch 822 including a mixer 843, a NCO 845, a stack RAM 846, a correlator 852, a magnitude squaring block 853, and a non-coherent integrator 858. The plurality of processing branches distributes and lowers the processing load. The satellite search process is therefore done in parallel, allowing for each parallel processing branch to be a dedicated GPS satellite searcher, which can be additionally time sliced to observe additional satellites in a series (such as while the A-RAM 409 is being filled). In any of the above mentioned embodiments, it should be clear that the processing elements after the A and B memory can be implemented with a single programmable digital signal processor, multiple programmable digital signal processors, dedicated hardware processors, or a combination of programmable digital signal processors and dedicated hardware.

Figure 9:
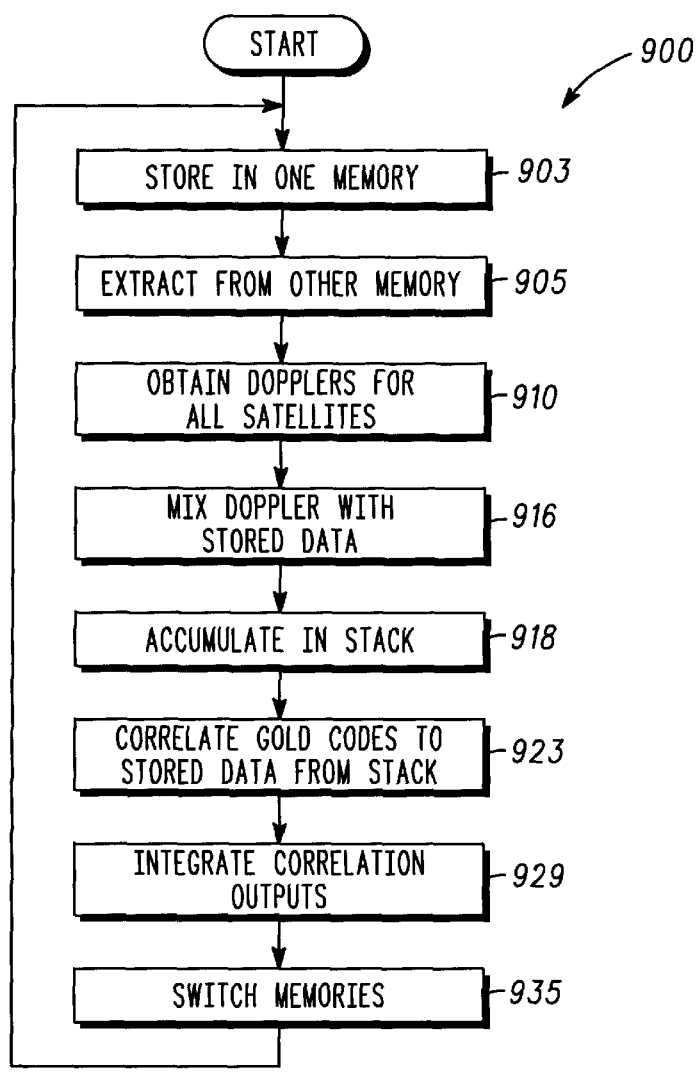
FIG. 9 shows a flow chart of a second method of the present invention.

FIG. 9 shows a flow chart 900 of a second method of the present invention. In step 903 the incoming digital GPS data signal is stored in a memory. The memory may be either the first memory 409 or the second memory 410.

In step 905, a previously stored digital GPS data segment is extracted from the other memory, i.e., the memory not used by step 903 above. Therefore, if step 903 is storing data in the first memory 409, then a data segment is being extracted in step 905 from the second memory 410. Conversely, if step 903 is storing data in the second memory 410, then step 905 is extracting a data segment from the first memory 409 (again see FIG. 5).

In step 910, the GPS receiver obtains predetermined Doppler signatures for each visible satellite. The predetermined Doppler signatures are preferably obtained from a wireless base station or by computing the Doppler signature based upon a locally stored ephemeris, approximate position of the receiver, and approximate times. Because the GPS receiver functions essentially as a mobile unit within a wireless network, the GPS receiver does not need to consume resources and processor time by deriving all needed data from a GPS signal. Instead, a base station may determine visible satellite Gold codes, satellite time, etc., and pass this data on to all mobile stations in the network. Therefore, the GPS receiver receives the Gold codes of all visible satellites and approximate (expected) Doppler shifts.

In step 916, the predetermined Doppler signatures for all visible GPS satellites are mixed with (complex multiplied by) the extracted data segment to remove any Doppler shifts in the received GPS signal.

In step 918, the GPS signal data, minus Doppler, is accumulated in the stack RAM 136. The GPS signal data from the first memory 409 or second memory 410 is processed such that the first sample of the first millisecond is added to the first sample of the second millisecond is added to the first sample of the third millisecond, etc., until the end of the first or second memory is reached. The preferred embodiment has an integer number of millisecond of storage, up to and including 20 milliseconds of GPS signal data stored in the first and second memories, therefore in the preferred embodiment, up to 20 samples are added or accumulated together and stored into the first millisecond storage of the stack RAM 136. The first and second memories are therefore preferably compressed by a factor of two to twenty, depending on the size of stack RAM. Subsequent samples of the first or second memory are then similarly processed, i.e., the stacking or adding of a particular millisecond of GPS signal data. This process continues until the first or second memory is empty and the stack RAM 136 is filled. The filling and extracting operations are then switched.

This accumulation offers several advantages. First, processing more data yields an additional signal processing gain. Second, it allows a reduction in the processing rate of a downstream signal processor. Third, it may reduce the number of FFT correlators needed to process the signal.

In step 923, the accumulated signal segment is correlated by a plurality of parallel correlators. A correlator correlates a received GPS signal against a predetermined Gold code, in effect comparing Gold codes within the GPS signal to a predetermined Gold Code. Each correlator and therefore each parallel circuit branch sift out a unique, expected GPS satellite signal.

The output of each correlator yields a pulse for each visible GPS satellite, with a pulse occurring a time interval after a satellite time (the satellite time is received from the network base station). The time interval indicates a transit time from the satellite to the GPS receiver for that particular satellite. These time intervals are used by the GPS receiver 800 to obtain a positional fix.

In step 929, the correlation outputs are integrated by a plurality of parallel, non-coherent integrators to produce a stronger, more easily detectable correlation output pulse. The resultant pseudorange signals (output pulse time intervals) may be used by a downstream processor to compute an ultimate positional fix (each output 711A–711H corresponds to a unique visible GPS satellite).

In step 935, the predetermined time period has expired, and the storing and extracting steps switch memories. In this fashion, the GPS receiver can store an incoming GPS signal while simultaneously processing a received signal. The method 900 operates with a reduced memory requirement, and may be used to process incoming GPS signals in real-time.

Figure 10:
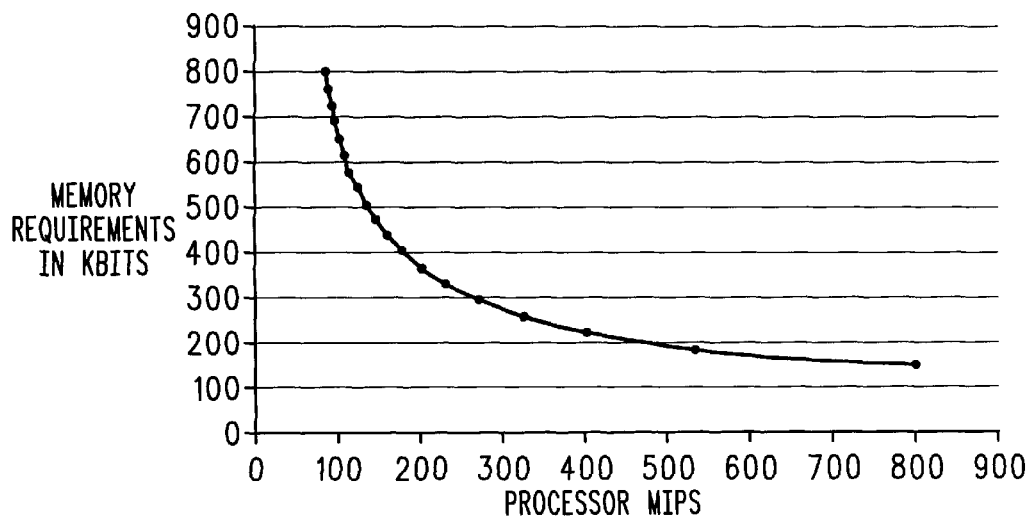
FIG. 10 shows a graph illustrating the relationship between the memory size and the processor speed.

FIG. 10 shows a graph illustrating the relationship between the memory size and the processor speed. As can be seen from the graph, there is a definite trade-off between memory size and processor speed. For the dual memory approach of the present invention, a memory size of 800 kilobits translates to a required processor throughput of about 100 MIPS. In a second example, a memory size of about 150 kilobits requires a processor speed of about 800 MIPS. It is just a matter of time until programmable digital signal processor technology can consistently and efficiently achieve this MIPS level with low power. Indeed, DSP chips are now available with processing MIPS capabilities exceeding 1000 MIPS, and hardware FFT accelerators such as the Motorola MC92307 can act as a peripheral to supplement lower capability DSPs in order to easily achieve the required processing throughput levels.

Another way to predict a required real-time processor MIPS is to use run-time measurements from existing known FFT processing run times on programmable signal processors. It is known from U.S. Pat. No. 4,998,111 to Durboraw and Ma that the processing steps of an tit correlator include a forward 2048 point complex FFT, a point-by-point multiplying function, and a reverse 2048 point complex FFT function. Most of the processing time is consumed by the 2048 point FFT and inverse FFT processing functions, so the FFT run time will be used to scale the MIPS loading requirement. The Motorola DSP56002 digital signal processor data sheet describes the DSP as a 40 MIP processor when running at 80 MHz. The data sheet describes that this particular digital signal processor can compute a 1024 point complex FFT in 59,898 clock cycles. When scaled by the 80 MHz clock rate, the 1024-point complex FFT would be completed in 0.748 milliseconds. One can scale this run time to an approximate run time for the required 2048 point complex FFT by the known relationship that the FFT run time grows proportional to N * LOG (N), where N is the number of points in the FFT processing. Thus, the multiplier in run-time from a 1024 point FFT to a 2048 point FFT is approximately given by the ratio (2048 * log (2048)) /(1024 * log (1024)), or approximately 2.2 times 0.748 milliseconds; or 1.496 milliseconds. Given that both a forward and a reverse FFT is required per FFT correlation, the total run-time for the FFT and inverse FFT is approximately 2.992 milliseconds. Given that the number of operations of the point-by-point multiply function are minor compared to the forward and inverse FFT processing, it is sufficient to say that a 40 MIP DSP can compute one 2048 point complex FFT correlation in less than 4 milliseconds. Given that the present invention is based on a 2048 point complex FFT signal processing element, the predicted processing time of the FFT from the Motorola DSP56002 data sheet can be scaled to determine the throughput required for a real-time mode using the A and B (first and second) memory of the present invention. For purposes of simplifying the math, to be conservative, and to account for a final non-coherent summation (squared magnitude and additions), we assume that a 50 MIPS DSP processor is used in order to complete the total end-to-end task in the originally predicted 4 milliseconds. Based on a 50 MIPS processor, for example, it is possible to determine how many FFT-based correlator functions (and therefore how many parallel satellite signals) can be processed in one N millisecond sample time. Given that it is desired that the architecture be able to process at least 8 parallel satellite correlations in the N millisecond interval, a relationship can be established as described below.

From previous measurements of the FFT on the DSP56002 processor, one cycle of a DSP-based 2048 point complex FFT correlator with a final non-coherent integration cycle added can complete in approximately 4 milliseconds, to complete one cycle using a 50 MIPS DSP.

The stacking process can be accomplished by a DSP or by dedicated hardware. Dedicated hardware will likely be faster and may accomplish this task in about 2048*N_ms*Tc seconds. N_ms is defined as the number N of 1 millisecond intervals stored in either the first and second memory, and Tc is the system clock rate. As a first order approximation, this stacking time can be considered small compared to the FFT, inverse FFT, point-by-point multiply, and the non-coherent integration time, and can be ignored. Therefore, $$T\_total=8*(FFT\_Integration\_Time); \quad (1)$$

$$T\_total=N\_ms*0.001 \text{ seconds}; \quad (2)$$

$$FFT\_Integration\_Time=(0.004 \text{ ms}*50)/MIPS; \quad (3)$$

where MIPS is the DSP performance required. Thus, solving the three simple equations (1)–(3) allows a formula for MIPS based on the storage memory requirements of the first and second memory, as follows:

$$MIPS=1600/N\_ms; \quad (4)$$

where equation (4) is the processor throughput MIPS required to keep up with a N-millisecond capacity first and second memory. Equivalently:

$$N\_ms=1600/MIPS; \quad (5)$$

where equation (5) yields the number of milliseconds N_ms that must be stored in the first and second memory to accommodate a desired processor MIPS capability. For example, both equations (4) and (5) show that if the A and B RAM store 10 milliseconds of GPS signal data, the throughput required by the processor to keep up in real-time on eight satellites is approximately 160 MIPS.

In order to minimize the search time, assigning of satellite to a finite number of available search bins need to be optimized. To accomplish this, the size, shape and other dynamics and interdependencies of the search space need to be considered. For example, the Doppler search space for each satellite is a function of the accuracy of the ephemeris that predicts the satellite orbit dynamics. It is well known that fresh satellite ephemeris data (i.e., that within 4 hours of age) can be used to reliably predict the Doppler frequency of a satellite to well under 1 Hz accuracy, given that the user knows his current location. If the user does not know his location, but for example, only knows his approximate location (within X meters, for example), it is known that the uncertainty of the Doppler estimate of GPS satellites varies by as much as 1 Hz of Doppler change per kilometer of position error. Consequently, if the user does not know his location any better than 100 km, for example, then the Doppler parameter for any or all satellites can be different from that predicted by the ephemeris and the approximate position and time by as much as 100 Hz.

A 100 km position error is generally obtainable if the GPS receiver has knowledge of which city it is located. This can be generally obtained from cell-sector ID methods, or from some other method of identifying a particular cellular handset to particular region, such as an operator ID code, for example, which can restrict the and set to a particular region. Depending on the bandwidth by which the receiver searches for the satellite signals, this Doppler estimate could be one or more search bins away from the estimated search bin.

For example, if the receiver uses coherent integration to achieve a 1 millisecond pre-detection integration interval (PDI), it is well known in the art that the receiver can detect the signal as long as the Doppler falls within +/−500 Hz of its test Doppler frequency (and the signal is of sufficient strength for detection). Likewise, if the coherent integration interval is 10 milliseconds, then the Doppler test window is +/−50 Hz wide. In the second example, given a 100 km initial position estimate error, it is possible to miss detecting the signal since the Doppler window is only +/−50 Hz wide and the signal can be as far as 100 Hz in Doppler error. This causes the receiver to be designed in such a way as to search a larger number of Doppler test bins either simultaneously, or serially.

Another parameter that affects the Doppler search accuracy (and therefore influences the search window that needs to be tested) is the time estimate. The ephemeris data and initial position estimate combine to produce the accurate Doppler readings as long as the time is correct. The GPS satellite orbits are such that the Doppler rate of change can be as large as 1 Hz per second, thus, at a maximum, a 1-minute time error can produce up to a 60 Hz Doppler frequency error.

Finally, the last thing that influences Doppler frequency error (and by far the largest in some applications) is caused by the GPS receiver reference oscillator error. It is well known that the reference oscillator error (i.e., its offset from its design nominal condition) creates a common mode Doppler error that is a constant for every satellite that is observed. This common bias can be determined once the navigation equations for position and rate of change of position are computed, but its value is generally unknown at the beginning of a search. If, for example, the reference oscillator contains a 1 part per million (PPM) frequency error from what is expected, then there can be a 1 part per million shift in the L-band Doppler frequency, which is 1575 Hz. It is the sum of these error sources that will expand or contract the Doppler search space. Phase and/or frequency locking, or frequency calibration methods of referring the GPS reference oscillator to a higher precision reference oscillator, are methods that can be used to greatly reduce the Doppler search space. For example, it is well known that a CDMA cell phone reference oscillator is internally adjusted by the CDMA handset to be within 0.05 PPM of the signal sent from the infrastructure to the handset. As such, it is possible to lock or calibrate the GPS reference oscillator to this more precise CDMA phone reference oscillator for purposes of greatly reducing the Doppler search space for the GPS signals.

A larger Doppler search space will require a longer time to find signals, while a smaller Doppler search space will require a shorter time to find the signals. The absolute time interval is a function of the number of independent satellite searchers that can be applied to the problem.

From the standpoint of the Doppler search, one can summarize the various elements that influence the Doppler search pattern as follows:

Time Error: 1 Hz/second

Position Error: 1 Hz/1 km position error

Oscillator Error: 1575 Hz per PPM of oscillator error (this is common mode). It should be obvious that the largest error comes from oscillator error.

A good search strategy can reduce the size of the Doppler search space. One optimal search strategy is a use of search resources to look for a first satellite. Once one of the searcher resources finds a single satellite, then the oscillator error term is known for all secondary satellites that are searched. Thus, it is possible for a search process to be dynamic in nature, and may optimally choose a search order (i.e., how many searchers to look for a first satellite, which satellite is best, etc.), and which satellites to look for second, third, and so forth.

Figure 11:
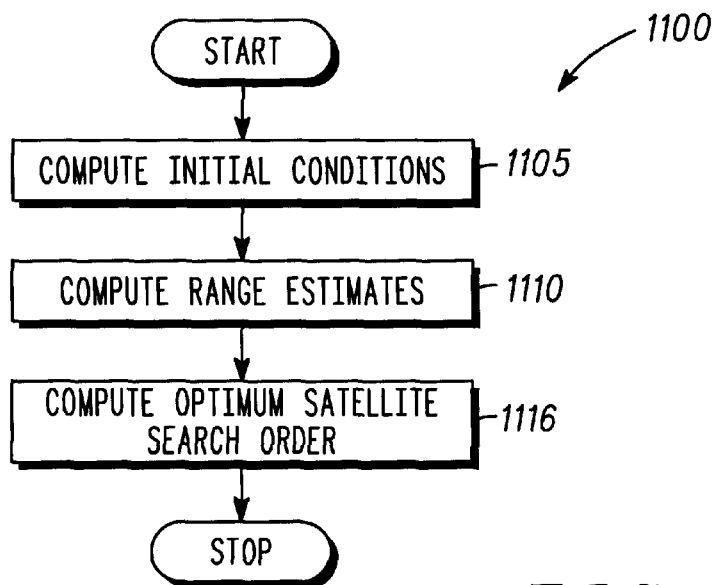
FIG. 11 shows a flowchart illustrating how a satellite search order selection process may be refined.

This dynamic satellite search order selection process is driven by the estimate of how well the reference oscillator frequency is known, and how accurately the receiver knows time and its initial position estimate. FIG. 11 shows a flowchart 1100 illustrating how a satellite search order selection process may be refined. In step 1105, the initial conditions are computed. For example, initial position estimate can be made by using the last known GPS fix (accurate to 10's of meters) and knowledge of how long it has been since this position was computed. Thus, the contribution to Doppler error based on position error can be made as simply as the time difference from the last fix and some maximum assumed velocity, or alternately, it can be made more precisely by modeling the Doppler error as a function of position error for each satellite in the constellation, and dynamically setting each satellite Doppler search range individually, choosing to look for the first satellite that has the smallest possible Doppler search range.

Given that there are a finite number of GPS satellite signal searchers that can be assigned to a particular problem (for example, eight processing branches as shown in FIG. 8), depending on the oscillator uncertainty, it may be optimum to use all searchers to find a first satellite. Once the first satellite is found, then the Doppler uncertainty reduces for all remaining satellites to a much smaller value. Then, the remaining searchers (i.e., the one searcher that found the first satellite is not used), can then be used to search for one each of the remaining 7 visible satellites. This creates an N-step process, driven by an optimization algorithm, that chooses the first satellite or satellites based on its minimum Doppler search range (or its elevation angle). The remaining satellites are then found, allowing for acquisition of all satellites in the minimum amount of time.

In step 1110, the code phase search range dimension can also be computed and optimized in a similar manner, by recognizing that the code phase search range is a function of an initial position error and handset clock time error. It is also recognized that the code phase error integrates as a function of Doppler error, and can grow over time to larger and larger values. It is possible that the code phase search range can be also optimized together with the Doppler search range so as to minimize the total space to find a first satellite or satellites, and then reducing greatly the search space for the remaining satellites.

In step 116, an optimum satellite search order is computed. As previously mentioned, a first GPS satellite to be found may be a satellite having a minimum Doppler search range (such as a satellite most directly overhead). Alternatively, the first satellite found may be selected based on an elevation angle.

An example is given by which time is not precisely known in the handset (to say, only 10 seconds), and the initial position is known to within 10 km. Given this, knowledge of the code phase of any of the satellites is not known at the start, but what is known is their relative delays (for example, the code phase of SV1 compared to SV2 is known to within approximately +/−20 km maximum) because the relative delays (i.e., ranges) are known by the initial position, ephemeris, and time, and satellite clock correction parameters. Consequently, a complete code phase search space may need to be searched for a first satellite, but thereafter, the relative delay ranges can be computed in order to find the remaining satellites.

It is possible to create a search algorithm that minimizes the search space over code and Doppler for all satellites by:

a) Computing an initial position estimate, and uncertainty;
b) Computing a time estimate and time uncertainty;
c) Computing an oscillator frequency estimate and uncertainty;
d) Using initial position, time, and ephemeris and clock correction data to computer satellite positions and Dopplers;
e) Computing range estimates to the satellites;
f) Computer Doppler search-range estimates to the satellites; and
g) Computing an optimum search order to assign satellite, Doppler search bins and code phase search bins to the finite number of searchers so as to minimize the total search time.

Figure 12:
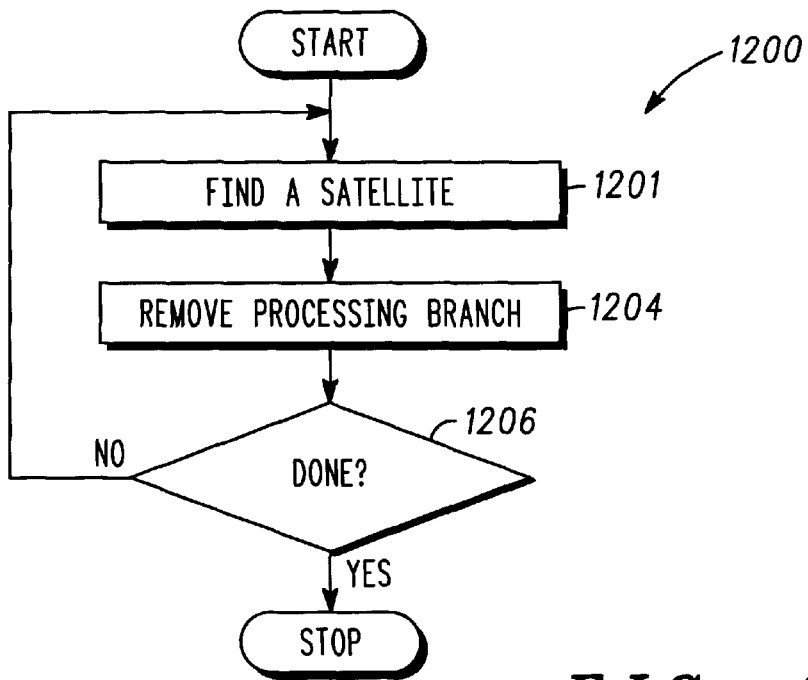
FIG. 12 shows a flowchart illustrating how the apparatus of the third embodiment may be employed in an optimal satellite search.

FIG. 12 shows a flowchart 1200 illustrating how the apparatus of the third embodiment 800 may be employed in an optimal satellite search. In step 1201, multiple processing branches 822 are set to find a first satellite. This may be a first satellite as determined by the method 1100 of FIG. 11. This speeds up the acquisition of the first satellite.

In step 1204, the successful search processing branch 822 (the searcher) is removed from the available set of processing branches.

In step 1206, the method checks to see if the searching is completed. The searching may be completed when either all visible satellites are found or when all processing branches have found a satellite. If not completed, the remaining searchers continue to search.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A GPS receiver data storage apparatus comprising:
   a first switch, said first switch receiving a digital GPS data;
   a first memory capable of storing at least two milliseconds of said digital GPS data;
   a second memory capable of storing at least two milliseconds of said digital GPS data in parallel with said first memory, with said first memory and said second memory being selectable by said first switch for filling with said digital GPS data; and
   a second switch selectable between said first memory and said second memory for extracting said digital GPS data therefrom;
   wherein GPS signal processing extracts digital GPS data from said first memory while said second memory is being filled and extracts digital GPS data from said second memory while said first memory is being filled, and stacks said at least two milliseconds of digital GPS data from one of said first and second memory into a one millisecond sample.

2. The apparatus of claim 1, wherein said first memory and said second memory allow said digital GPS data to be processed in real time.

3. The apparatus of claim 1, wherein said first switch is further connected to a source of said digital GPS data.

4. The apparatus of claim 1, wherein said second switch is further connected to a downstream digital signal processing device.

5. The apparatus of claim 1, wherein a first memory size and a second memory size are dependent on a throughput of a downstream digital signal processor.

6. The apparatus of claim 1, wherein a first memory size and a second memory size are dependent on a throughput of a downstream coherent integrator device.

7. The apparatus of claim 1, wherein a downstream digital signal processor speed is inversely related to a first memory size and a second memory size.

8. A GPS receiver apparatus, comprising:
   a first switch, said first switch receiving a digital GPS data;
   a first memory;
   a second memory in parallel with said first memory, with said first memory and said second memory being selectable by said first switch for filling with said digital GPS data;
   a second switch selectable between said first memory and said second memory for extracting said digital GPS data therefrom;
   a mixer connected to said second switch and further connected to a numerically controlled oscillator with said numerically controlled oscillator being provided with a predetermined Doppler characteristic, said mixer being capable of removing said predetermined Doppler characteristic from said digital GPS data;
   a stack RAM connected to said mixer, said stack RAM being capable of accumulating a predetermined time interval of said digital GPS data from said mixer;
   a correlator connected to said stack RAM, said correlator also receiving a predetermined Gold code, with said correlator being capable of correlating said predetermined Gold code against said digital GPS data;

a magnitude squaring block connected to said correlator, said magnitude squaring block squaring the correlation output to produce a squared integration output; and a non-coherent integrator connected to said magnitude squaring block and capable of integrating said squared integration output to provide a pseudorange and Doppler characteristic output;

wherein GPS signal processing extracts digital GPS data from said first memory while said second memory is being filled and extracts digital GPS data from said second memory while said first memory is being filled, and wherein said first memory and said second memory allow said digital GPS data to be processed in real time;

wherein said numerically controlled oscillator is capable of being provided with a Doppler characteristic for a selected visible GPS satellite and said correlator is capable of being provided with a corresponding Gold code for said selected visible GPS satellite to enable said apparatus to process a digital GPS data for said selected visible GPS satellite.

9. The apparatus of claim 8, wherein said correlator is a Fast Fourier-Transform correlator.

10. The apparatus of claim 8, wherein said unique predetermined Doppler characteristic is an estimate.

11. The apparatus of claim 8, wherein said first switch is further connected to a source of said digital GPS data.

12. The apparatus of claim 8, wherein a first memory size and a second memory size are dependent on a throughput of a downstream digital signal processor.

13. The apparatus of claim 8, wherein a first memory size and a second memory size are dependent on a throughput of a downstream coherent integrator device.

14. The apparatus of claim 8, wherein a downstream digital signal processor speed is inversely related to a first memory size and a second memory size.

15. The apparatus of claim 8, wherein said mixer receives a predetermined Doppler signature for each visible GPS satellite.

16. The apparatus of claim 8, wherein said stack RAM is a dual port stack RAM.

17. The apparatus of claim 8, wherein a throughput rate of said digital signal processor is inversely proportional to the digital GPS data storage capacity of said first memory and said second memory.

18. The apparatus of claim 8, further including a local DSP results RAM capable of storing a plurality of digital GPS data for said each visible GPS satellite.

19. A method of storing and processing a digital GPS data in a GPS receiver having a reduced amount of memory, comprising the steps of:

storing said digital GPS data in a first memory as a first stored digital GPS data segment during a first predetermined time period of at least two milliseconds;

extracting a second stored digital GPS data segment of at least two milliseconds from a second memory simultaneous with said storing of said digital GPS signal in said first memory; and stacking said second stored digital GPS data segment of at least two milliseconds into a one millisecond sample;

wherein during subsequent predetermined time periods said storing step alternates between said first memory and said second memory while said extracting step alternates between said second memory and said first memory, and said stacking step alternates between a stored digital GPS data segment from said second memory and a stored digital GPS data segment from said first memory.

20. The method of claim 19, wherein said storing is performed by a first switch capable of alternately storing said digital GPS data to said first memory and to said second memory.

21. The method of claim 19, wherein said extracting is performed by a second switch capable of alternately extracting a stored digital GPS data segment from said first memory and from said second memory.

22. A method of storing and processing a digital GPS data in a GPS receiver having a reduced amount of memory, comprising the steps of:

storing said digital GPS data in a first memory as a first stored digital GPS data segment during a first predetermined time period of at least two milliseconds;

extracting a second stored digital GPS data segment of at least two milliseconds from a second memory simultaneous with said storing of said digital GPS signal in said first memory;

generating a predetermined Doppler signature for a subject visible satellite;

mixing said predetermined Doppler signature with said second stored digital GPS data segment to remove a Doppler characteristic from said second stored digital GPS data segment;

correlating a Gold code of said subject visible satellite to said second stored digital GPS data segment, producing a correlation output; and integrating said correlation output to produce a pseudorange output and a Doppler output;

wherein said generating step through said mixing step are repeated for each visible satellite, and wherein during subsequent predetermined time periods said storing step alternates between said first memory and said second memory while said extracting step alternates between said second memory and said first memory, and said stacking step alternates between a stored digital GPS data segment from said second memory and a stored digital GPS data segment from said first memory.

23. The method of claim 22, wherein said storing is performed by a first switch capable of alternately storing said digital GPS data to said first memory and to said second memory.

24. The method of claim 22, wherein said extracting is performed by a second switch capable of alternately extracting a stored digital GPS data segment from said first memory and from said second memory.

25. The method of claim 22, wherein said predetermined Doppler signature is received from a base station.

26. The method of claim 22, wherein said correlating is performed by a plurality of parallel FFT correlators.

27. The method of claim 22, wherein said correlating is performed by eight parallel FFT correlators.

28. The method of claim 22, wherein said integrating is performed by a plurality of parallel non-coherent integrators.

29. The method of claim 22, wherein said integrating is performed by eight parallel non-coherent integrators.

* * * * *

UNITED STATES PATENT AND TRADEMARK OFFICE
CERTIFICATE OF CORRECTION

PATENT NO. : 6,583,758 B2 Page 1 of 1
DATED : June 24, 2003
INVENTOR(S) : King, Thomas M.

It is certified that error appears in the above-identified patent and that said Letters Patent is hereby corrected as shown below:

Column 15,
Line 14, add the following after "filled," -- and stacks said at least two milliseconds of digital GPS data from one of said first and second memory into a one millisecond sample. --

Signed and Sealed this

Twenty-eighth Day of October, 2003

JAMES E. ROGAN
*Director of the United States Patent and Trademark Office*